(12) United States Patent (10) Patent No.: US 9,122,500 B2
Klose et al. (45) Date of Patent: Sep. 1, 2015

(54) METHOD FOR PRECONFIGURING AN APPLIANCE, AND METHOD FOR STARTING UP THE APPLIANCE

(71) Applicant: Robert Bosch GmbH, Stuttgart (DE)

(72) Inventors: Hans-Peter Klose, Stuttgart (DE); Igor Tchoudovski, Hallbergmoos (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 13/688,539

(22) Filed: Nov. 29, 2012

(65) Prior Publication Data

US 2013/0138942 A1 May 30, 2013

(30) Foreign Application Priority Data

Nov. 30, 2011 (DE) .......................... 10 2011 087 382

(51) Int. Cl.
| | |
|---|---|
| *G06F 9/24* | (2006.01) |
| *G06F 15/177* | (2006.01) |
| *G06F 9/445* | (2006.01) |
| *G06F 13/16* | (2006.01) |
| *G06F 21/31* | (2013.01) |
| *G06F 21/60* | (2013.01) |
| *G06F 15/78* | (2006.01) |
| *G06F 11/14* | (2006.01) |

(52) U.S. Cl.
CPC .......... *G06F 9/44505* (2013.01); *G06F 11/1417* (2013.01); *G06F 13/1663* (2013.01); *G06F 15/7871* (2013.01); *G06F 21/31* (2013.01); *G06F 21/60* (2013.01)

(58) Field of Classification Search
CPC . G06F 11/1417; G06F 13/00; G06F 13/1663; G06F 15/7871; G06F 21/31; G06F 21/60
USPC .................. 713/1, 2, 100; 709/220, 227, 253; 717/168, 174
See application file for complete search history.

(56) References Cited

U.S. PATENT DOCUMENTS

2007/0249286 A1 10/2007 Ma et al.
2007/0294457 A1* 12/2007 Gantman et al. .............. 710/313

FOREIGN PATENT DOCUMENTS

WO 03/056746 A1 7/2003

* cited by examiner

*Primary Examiner* — Michael J Brown
(74) *Attorney, Agent, or Firm* — Maginot, Moore & Beck LLP

(57) ABSTRACT

A method for preconfiguring an appliance having a configuration memory configured to have information written to it when the appliance is in a deactivated state, wherein the appliance is configured to make contact with at least one further appliance during operation, includes capturing a data record from the appliance, wherein the data record contains at least identification data from the appliance. The method further includes determining a piece of configuration information from the appliance by using the data record and at least one data record from the at least one further appliance, and writing the configuration information to the configuration memory of the appliance in order to preconfigure the appliance.

7 Claims, 3 Drawing Sheets

METHOD FOR PRECONFIGURING AN APPLIANCE, AND METHOD FOR STARTING UP THE APPLIANCE

This application claims priority under 35 U.S.C. §119 to German patent application no. DE 10 2011 087 382.1, filed Nov. 30, 2011 in Germany, the disclosure of which is incorporated herein by reference in its entirety.

BACKGROUND

The present disclosure relates to a method for preconfiguring an appliance and to a method for starting up the appliance, to an appropriate controller, to an appropriate computer program product and to a configuration memory and an appliance.

In a conventional system comprising a plurality of appliances which are capable of communication among one another, the start of the communication, for example the initial startup, requires an alignment of identifying data. To some extent, it is also necessary for the data to be input manually into the appliances in order to allow the communication. By way of example, WO 2003 056 746 A1 describes how a connection between a first and a second appliance is initialized. The first and second appliances are paired directly with one another in a pairing method. This involves the production of a connection key which allows the interchange of messages between the two appliances.

SUMMARY

Against this background, the present disclosure presents a method for preconfiguring an appliance and a method for starting up the appliance, an appropriate controller, an appropriate computer program product and also a configuration memory and an appliance as described herein. Advantageous refinements are also described herein.

Requisite data for communication between individual appliances in a system can be interchanged between the appliances automatically and centrally when the appliances have a configuration memory which is designed to be able to have information written to and read from it from outside the appliances. The appliances can then be connected to form the system prior to sending when they leave the warehouse. The configuration memory can be used to store identification data from the appliances in the system while the individual appliances are in a deactivated state, for example while the appliances are stored in a shipping package.

Advantageously, a preconfigured system allows a user to unpack the appliances, set up a supply of power, and the appliances will search for their already preconfigured partners in the system and set up secure and stable communication between the appliances. No further configuration step is required from the user.

A method for preconfiguring an appliance comprises a step of capture, a step of determination and a step of writing. The appliance has a configuration memory which is designed to have information written to it when the appliance is in a deactivated state. The appliance is designed to make contact with at least one further appliance during operation.

The step of capture involves a data record from the appliance being captured, wherein the data record contains at least identification data from the appliance.

The step of determination involves a piece of configuration information from the appliance being determined by using the data record and at least one data record from the at least one further appliance.

The step of writing involves the configuration memory of the appliance having the configuration information written to it in order to preconfigure the appliance.

An appliance can be understood to mean an appliance in a ready-for-shipment condition. The preconfiguration can take place during or immediately before the shipping process. By way of example, the appliance may be a system component from telemedicine, such as a sensor for vital parameters or a diagnosis unit for different sensors. By way of example, a data record can comprise information about an appliance type of the appliance, a version of the appliance, a communication address of the appliance or an encryption key of the appliance. The data record may be stored in a central database, and can be assigned to the appliance by means of a barcode or an RFID chip, for example. A piece of configuration information can represent a combination of data records from different appliances associated with an overall system. The configuration information can, in particular, logically combine (for example) the identification data from the appliances with one another.

The method may comprise a step of storing the configuration information from the appliance in a database that is external to the appliance. The configuration information can be stored for later use. By way of example, the configuration information can be used to subsequently configure an additional appliance for the overall system. Similarly, the original data record can be stored in order to be able to replace the appliance as required.

The step of capture can involve the data record being read from the configuration memory. The configuration memory may contain information already before the write operation. In that case, it is unnecessary for the data record to be assigned to the appliance externally to the appliance.

The method may comprise a step of storage which involves the data record from the appliance being stored in the configuration memory. The data record can be stored in the configuration memory in a separate step before the appliance is preconfigured by means of the approach presented here. By way of example, the data record can be stored in the configuration memory at the conclusion of production of the appliance.

The step of writing may involve the appliance being in a deactivated state while information is written to the configuration memory. The write operation can be performed quickly, whereas starting the appliance would require time. In addition, the appliance would need to be supplied with power. The configuration memory requires little power and can be supplied with power via a data line.

The method may have a step of breaking a connecting line between an interface for writing to the configuration memory and an apparatus for preconfiguring which is executed in response to the configuration memory having the configuration information written to it. A connecting line may be a cable, for example. An interface for writing may be arranged on the appliance, and an apparatus for preconfiguring may be arranged at a position outside the appliance. By way of example, the apparatus for preconfiguring may be hierarchically superordinate to the configuration memory.

A method for starting up an appliance with a configuration memory has the following steps: (i) a piece of configuration information is read from the configuration memory when the appliance is supplied with power; (ii) the appliance is configured by using the configuration information; and (iii) at least one further appliance is sought by using identification data from the at least one further appliance, which identification data are stored in the configuration information.

The step of reading can involve the configuration memory of the appliance being supplied with power. Searching can represent readiness for communication with at least the one further appliance. By way of example, the step of searching can involve an active search for the further appliance, or passive waiting for the further appliance.

The step of reading can take place in response to initial startup. The configuration information can be stored permanently in the appliance after reading. Subsequent startups can take place more quickly.

The method may comprise a step of communication with the at least one further appliance when the at least one further appliance is found in the step of searching, wherein the communication takes place by using the identification data from the at least one further appliance.

A configuration memory for storing a piece of configuration information has the following features: (i) a first interface for transmitting the configuration information to an appliance when the appliance is activated; (ii) a memory for storing the configuration information when the appliance is in a deactivated state; and (iii) a second interface for writing the configuration information to the memory when the appliance is in a deactivated state.

A first interface may be a power and data interface. A memory may be a nonvolatile memory. By way of example, a second interface may have contact areas which are accessible from outside the appliance. The second interface may likewise be a power and data interface.

An appliance which is designed to communicate with at least one further appliance has the following features: (i) a housing; (ii) a configuration memory according to the approach presented here, to which information can be written from a position outside the appliance when the appliance is not being supplied with power, and which can be read by the appliance when the appliance is being supplied with power, wherein the configuration memory is arranged inside the housing, and the first interface is connected to the appliance, and the second interface is arranged on the housing; and (iii) a transport package, wherein contact can be made with the second interface from outside the transport package.

By way of example, the transport package may have electrical conductor tracks which extend from an exterior of the transport package to the second interface. The conductor tracks may be removable. Similarly, the second interface may be arranged such that it can be reached from outside the transport package. By way of example, contact can be made with the second interface by means of a connector.

The present disclosure also provides an apparatus which has units which are designed to carry out or implement the steps of the methods according to the disclosure. This variant embodiment of the disclosure in the form of an apparatus also allows the object on which the disclosure is based to be achieved quickly and efficiently.

In the present case, an apparatus can be understood to mean an electrical appliance which processes sensor signals and, on the basis thereof, outputs control and/or data signals. The apparatus may have an interface which may be in hardware and/or software form. In the case of a hardware form, the interfaces may be part of what is known as a system ASIC, for example, which contains a wide variety of functions of the apparatus. However, it is also possible for the interfaces to be dedicated, integrated circuits or, at least to some extent, to comprise discrete components. In the case of a software form, the interfaces may be software modules which are present on a microcontroller, for example, besides other software modules.

A further advantage is a computer program product having program code which can be stored on a machine-readable storage medium such as a semiconductor memory, a hard disk memory or an optical memory and is used to carry out the method according to one of the embodiments described above when the program is executed on a computer or an apparatus.

BRIEF DESCRIPTION OF THE DRAWINGS

The disclosure is explained in more detail below by way of example with reference to the appended drawings, in which.

DETAILED DESCRIPTION

In the description of exemplary embodiments of the present disclosure below, identical or similar reference symbols are used for the elements having a similar effect which are shown in the various figures, these elements not being described repeatedly.

Figure 1:
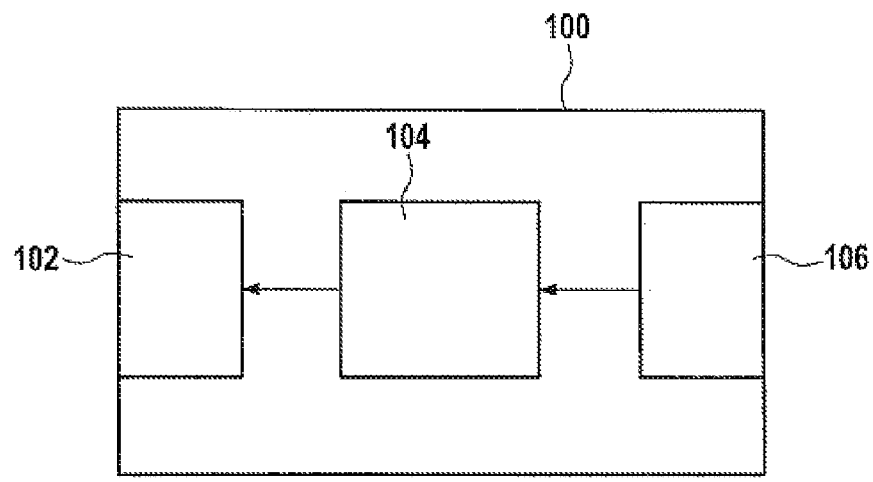
FIG. 1 shows a block diagram of a configuration memory based on an exemplary embodiment of the present disclosure.

FIG. 1 shows a block diagram of a configuration memory 100 based on an exemplary embodiment of the present disclosure. The configuration memory 100 is designed to store a piece of configuration information. The configuration memory 100 has a first interface 102, a memory 104 and a second interface 106. The first interface 102 is designed to transmit the configuration information to an appliance when the appliance is activated. The memory 104 is designed to store the configuration information when the appliance is in a deactivated state. The second interface 106 is designed to write the configuration information to the memory when the appliance is in a deactivated state. In the assembled condition, the first interface 102 is connected to the appliance and draws power from the appliance when the appliance is active. The second interface 106 is designed to supply the configuration memory 100 with power during a process of preconfiguration while the appliance is without power. The second interface 106 is used to write the configuration information to the memory 104 during the preconfiguration. The first interface 102 is used to transmit the configuration information to the appliance when the appliance is started up for the first time.

Figure 2:
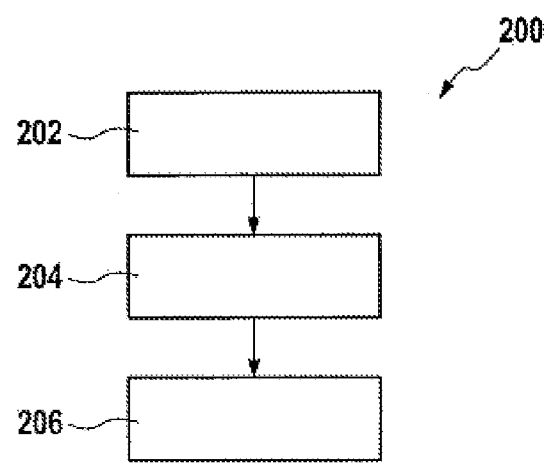
FIG. 2 shows a flowchart for a method for preconfiguring an appliance based on an exemplary embodiment of the present disclosure.

FIG. 2 shows a flowchart for a method for preconfiguring 200 an appliance based on an exemplary embodiment of the present disclosure. The method 200 has a step of capture 202, a step of determination 204 and a step of writing 206. The method 200 can be carried out on an apparatus for preconfiguring. The method 200 can be used on an appliance which is designed to make contact with at least one further appliance during operation and which has a configuration memory according to the approach presented here, which configuration memory is designed to have information written to it when the appliance is in a deactivated state. The step of capture 202 involves a data record from the appliance being captured, wherein the data record contains at least identification data from the appliance. The step of determination 204 involves a piece of configuration information from the appliance being determined by using the data record and at least one data record from the at least one further appliance. The step of writing 206 involves the configuration memory of the appliance having the configuration information written to it in order to preconfigure the appliance.

Figure 3:
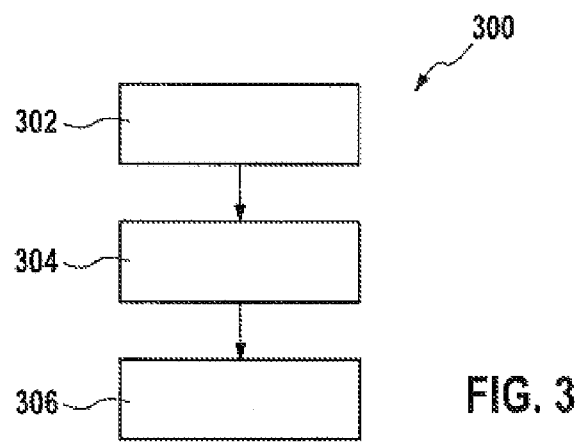
FIG. 3 shows a flowchart for a method for starting up an appliance based on an exemplary embodiment of the present disclosure.

FIG. 3 shows a flowchart for a method for starting up 300 an appliance based on an exemplary embodiment of the present disclosure. The method 300 has a step of reading 302, a step of configuring 304 and a step of searching 306. The method can be carried out by the appliance with a configuration memory. The step of reading 302 involves a piece of configuration information being read from the configuration memory when the appliance is supplied with power. The step of configuring 304 involves the appliance being configured by using the configuration information. The step of searching 306 involves at least one further appliance being sought by using identification data from the at least one further appliance, which identification data are stored in the configuration information. If the at least one further appliance is found, from which identification data are known, communication with the at least one further appliance takes place.

Figure 4:
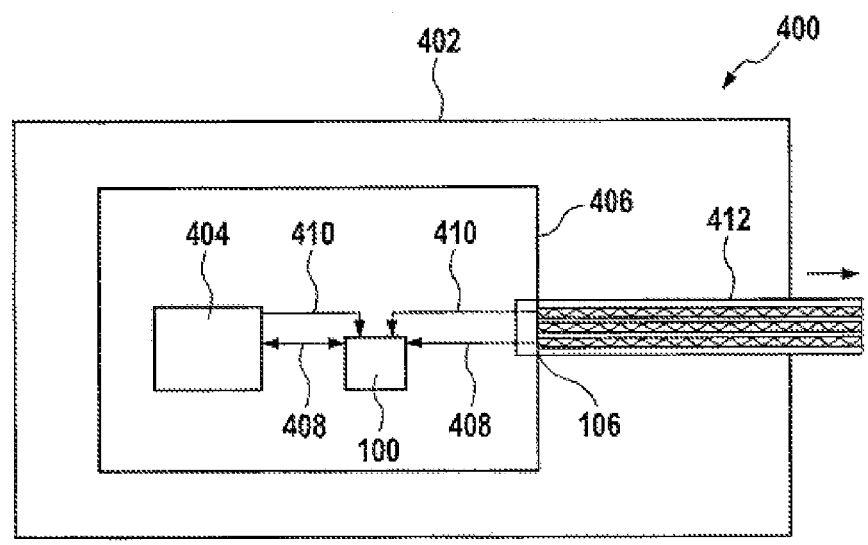
FIG. 4 shows an illustration of an appliance with a configuration memory based on an exemplary embodiment of the present disclosure.

FIG. 4 shows an illustration of an appliance 400 with a configuration memory 100 based on an exemplary embodiment of the present disclosure. The appliance 400 is arranged in a transport package 402. The appliance 400 has a functional unit 404 which is arranged inside a housing 406 of the appliance 400. The configuration memory 100 is likewise arranged inside the housing 406. The functional unit 404 is connected to the first interface of the configuration memory 100 by means of a data line 408 and a power line 410. The first interface is not shown separately. The second interface 106 of the configuration memory 100 is arranged on an outer wall of the housing 406 and is likewise connected to the configuration memory 100 by means of a data line 408 and a power line 410. The second interface 106 has a connecting line 412 connected to it which has a loose end which projects through the transport package 402. The connecting line 412 can be removed from the second interface 106 and the transport package 402 by pulling on the loose end.

Figure 5:
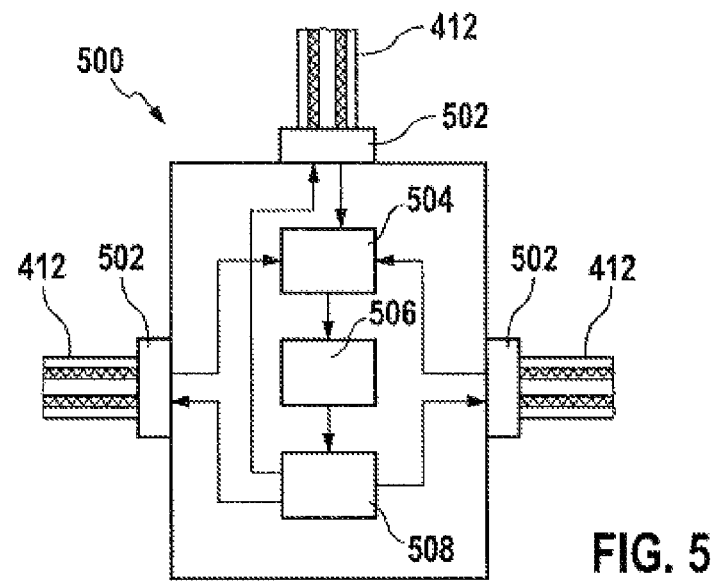
FIG. 5 shows an illustration of an apparatus for preconfiguring an appliance based on an exemplary embodiment of the present disclosure.

FIG. 5 shows an illustration of an apparatus for preconfiguring 500 an appliance based on an exemplary embodiment of the present disclosure. In this exemplary embodiment, the apparatus 500 has three interfaces 502 which are connected to loose ends of connecting lines 412, as are shown in FIG. 4. The apparatus for preconfiguring 500 has a device for capture 504, a device for determination 506 and a device for writing 508. The device for capture 504 is connected to the interfaces 502 and to the device for determination 506. The device for capture 504 is designed to capture a respective data record from one of the connected appliances. The device for determination 506 is connected to the device for writing 508. The device for determination 506 is designed to determine a piece of configuration information for the appliances by using the data records. The device for writing 508 is connected to the interfaces 502. The device for writing 508 is designed to write the configuration information to the configuration memories of the connected appliances in order to preconfigure the appliances.

Figure 6:
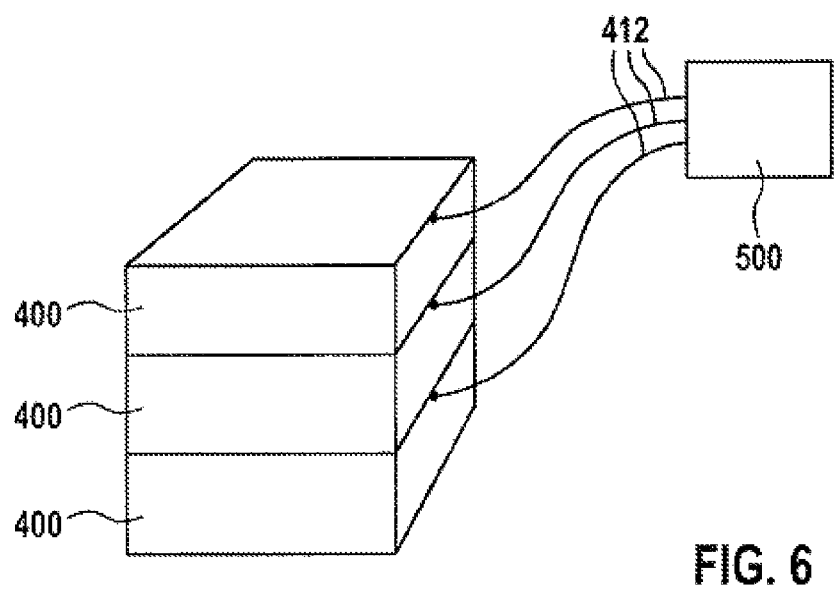
FIG. 6 shows an illustration of an arrangement of a plurality of appliances based on an exemplary embodiment of the present disclosure and an apparatus for preconfiguring the appliances based on an exemplary embodiment of the present disclosure.

FIG. 6 shows an illustration of an arrangement of a plurality of appliances 400 based on an exemplary embodiment of the present disclosure and an apparatus for preconfiguring 500 the appliances 400 based on an exemplary embodiment of the present disclosure. The appliances 400 are connected to the apparatus by means of connecting lines 412. As in FIG. 4, the appliances 400 are stored in transport packages. The transport packages have a respective one of the connecting lines 412 routed through them to the outside. The arrangement is shown during a process of preconfiguration. The apparatus for preconfiguring 500 reads a respective data record from the configuration memories of the appliances 400, determines the configuration information and writes the configuration information to the configuration memories via the connecting lines 412. Next, the connecting lines 412 are isolated from the apparatus 500, removed from the transport packages, and the appliances are shipped to a user.

In many instances of application, a service provider provides appliances 400 as a bundle. Particularly for older or sick people, installation/configuration of the system is an unreasonable task. Ideally, the system should be delivered preconfigured so that the users are able to use the system immediately. Since different appliance combinations are required for various users (e.g. for telemedicine—different sensors for diverse vital parameters), the systems should be configured prior to delivery to the user in order to register the components.

The approach presented here simplifies system installation and configuration. In this case, the appliances 400 are not switched on or unpacked during the configuration. The appliances 400 can be preconfigured in the package 402. Various appliances 400 can be stored separately in this case and combined into a system only shortly before delivery. Hence, the number of variants is reduced and the logistical process is optimized.

Each appliance 400 is equipped with a memory element 100 which is used to store the information relevant for pairing (subsequently referred to as a pairing memory 100). By way of example, a dedicated piece of public information (e.g. serial number, MAC address, public key, Bluetooth address, etc.) is stored. In addition, a piece of information about the other appliances 400 in the system can be stored after the pairing process. The dedicated information can be written to the pairing memory 100 during an end-of-line test, for example.

The pairing memory 100 can now have information written to it and be supplied with power both by the appliance 400 itself and via an additional interface 106. This external interface 106 can be implemented externally through the package 402 (e.g. using a ribbon cable 412 or band 412 with interconnects, which is subsequently referred to as a pairing band 412).

An additional appliance 500 (subsequently referred to as a pairing master 500) has connections 502 for pairing bands 412 from all the appliances 400 which are intended to be combined into a system. All the appliances 400 are connected to the pairing master 500 at the same time. The pairing master 500 ensures that the public information from the pairing memory 100 is interchanged.

The pairing memory 100 of each appliance 400 is supplied with power by the pairing master 500. The public information from the pairing memory 100 of all the appliances 100, for example, is read. Possibly, a system ID is generated. The information is combined and is stored in the pairing memory 100 of each appliance 400 (pairing information). The information can also be stored in a database (for example in order to add additional appliances 400 to the system later).

When the pairing memories 100 of all the appliances 400 have had information written to them, the pairing bands 412 can be removed from all the appliances 400. This is possible even without opening the package 402.

When an appliance 400 is first started, the pairing memory 100 is read and the appliance 400 adopts the system identifier and pairing information. Hence, all the appliances in the system are immediately ready for use.

The exemplary embodiments described and shown in the figures have been chosen only by way of example. Different exemplary embodiments can be combined with one another completely or in reference to individual features. It is also possible for an exemplary embodiment to have features from a further exemplary embodiment added to it.

In addition, method steps according to the disclosure can be repeated and performed in an order other than that described.

If an exemplary embodiment comprises an "and/or" conjunction between a first feature and a second feature, this is intended to be read to mean that the exemplary embodiment has both the first feature and the second feature in accordance with one embodiment and has either just the first feature or just the second feature in accordance with a further embodiment.

What is claimed is:

1. An appliance comprising:
   a housing;
   a memory held within the housing;
   a functional unit held within the housing and operatively connected to the memory through a first interface arranged within the housing;
   a connector formed through the housing and electrically connected to the memory through a second interface; and
   the appliance being configured to:
      operate in a first mode to receive with the second interface configuration data and store the configuration data in the memory, the configuration data being transmitted through the connector from a removable cable while the functional unit and the first interface are deactivated and disconnected from power and the memory receives power only through the second interface through the removable cable; and
      operate in a second mode with the second interface being deactivated, the functional unit and the first interface being activated and configured to read the configuration data from the memory through the first interface and operate the appliance with reference to the configuration data, the memory receiving power through only the first interface and the removable cable being disconnected from the connector in the second mode.

2. The appliance of claim 1 further comprising:
   a transport package configured to hold the housing of the appliance for shipment of the appliance, the transport package including an opening to enable the removable cable to be connected to and disconnected from the connector in the appliance when the transport package holds the housing.

3. The appliance of claim 1 wherein the memory is a nonvolatile memory device.

4. An apparatus for programming appliances comprising:
   a first interface operatively connected to a first memory in a first appliance through a first cable;
   a second interface operatively connected to a second memory in a second appliance through a second cable;
   a capture device configured to receive configuration data from the first interface and the second interface;
   a writing device configured to transmit configuration data through the first interface and the second interface; and
   a determining device operatively connected to the capture device and the writing device, the determining device being configured to:
      receive first configuration data from the first memory;
      receive second configuration data from the second memory;
      identify a hardware identifier associated with the first device with reference to the first configuration data;
      generate modified second configuration data to include the hardware identifier associated with the first device in the second configuration data; and
      transmit the modified second configuration data to the second memory to enable the second appliance to identify the first appliance.

5. The apparatus of claim 4, the first interface being configured to supply electrical power to the first memory in the first device while a first functional unit in the first device is deactivated and second interface being configured to supply electrical power to the second memory in the second device while a second functional unit in the second device is deactivated.

6. The apparatus of claim 4, the determining device being further configured to:
   identify the hardware identifier associated with the first device as one of a serial number, media access control (MAC) address, and public key in the first configuration data.

7. The apparatus of claim 4 wherein the first cable is operatively connected to an interface in the first appliance formed in a first housing of the first appliance and the first cable extends through an opening formed in a first transport package that holds the first housing and the second cable is operatively connected to another interface in the second appliance formed in a second housing of the second appliance and the second cable extends through another opening formed in a second transport package that holds the second housing.

* * * * *